United States Patent
Davis et al.

(10) Patent No.: US 11,070,080 B1
(45) Date of Patent: Jul. 20, 2021

(54) RESERVE POWER SUPPLY SYSTEM

(71) Applicant: LOFA Industries, LLC, Roswell, GA (US)

(72) Inventors: Brett Allen Davis, Suwanee, GA (US); Darwin Dowdie, Roswell, GA (US); Christopher Warren Fortenberry, Roswell, GA (US)

(73) Assignee: Cattron North America, Inc., Warren, OH (US)

( * ) Notice: Subject to any disclaimer, the term of this patent is extended or adjusted under 35 U.S.C. 154(b) by 0 days.

(21) Appl. No.: 16/839,376

(22) Filed: Apr. 3, 2020

(51) Int. Cl.
*H02J 9/06* (2006.01)

(52) U.S. Cl.
CPC .............. *H02J 9/068* (2020.01); *H02J 9/066* (2013.01)

(58) Field of Classification Search
CPC .................................. H02J 9/068; H02J 9/066
See application file for complete search history.

(56) References Cited

U.S. PATENT DOCUMENTS

| | | | |
|---|---|---|---|
| 7,545,118 B2 * | 6/2009 | Kim ......................... | G06F 1/26 320/128 |
| 9,812,878 B1 * | 11/2017 | Stieber .................. | H02J 7/0021 |
| 2013/0179719 A1 * | 7/2013 | Tseng ...................... | G06F 1/263 713/340 |
| 2015/0303695 A1 * | 10/2015 | Perry .................. | H01M 10/425 307/80 |

* cited by examiner

*Primary Examiner* — Daniel Cavallari
(74) *Attorney, Agent, or Firm* — Brundidge & Stanger, P.C.

(57) ABSTRACT

A reserve power supply system for providing a supplemental source of electrical power to a main power source. The system includes a backup battery and a switch that can be controlled to couple the backup battery to the main power source when reserve power is needed. The system also includes a sensor to detect when the backup battery should be engaged and a system control unit.

20 Claims, 3 Drawing Sheets

US 11,070,080 B1

RESERVE POWER SUPPLY SYSTEM

TECHNICAL FIELD

The present invention generally relates to the field of remotely located machinery and more particularly, is directed to a reserve power supply system for such machinery.

BACKGROUND OF THE INVENTION

As electronic communication methods and systems continue to improve and become more cost effective, so too does the desirability and practicality of decentralizing functions closer to their point of impact.

In a municipal water supply system, for example, it is beneficial for water pumps to be strategically located in the system where they can operate most efficiently. It would be counter-productive to efficiency if all water pumps within the system were located at a central pumping site.

While a central pumping site allows for more efficient control and monitoring of all pumps, such efficiency is lost many times over due to the need to run a multiplicity of water lines over much longer distances if each pump is located at its maximum point of impact with respect to efficiently moving water to an end use location. Moreover, centrally located water pumps requires pumps with more capacity and size in order to overcome the additive increase in fluid resistance and friction in longer pipe runs.

In other situations, safety concerns, convenience and avoidance of noise require that machinery be located remotely. In many such installations, the machinery is required to operate independently.

While the benefits of remotely locating certain machinery, such as water pumps, are clear, the problem remains as to how such machinery can be operated as autonomously as possible with only minimal or no remote monitoring and/or control.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

DESCRIPTION OF THE PREFERRED EMBODIMENT

An example embodiment of the present invention will now be described with reference to the accompanying drawings.

Figure 1:
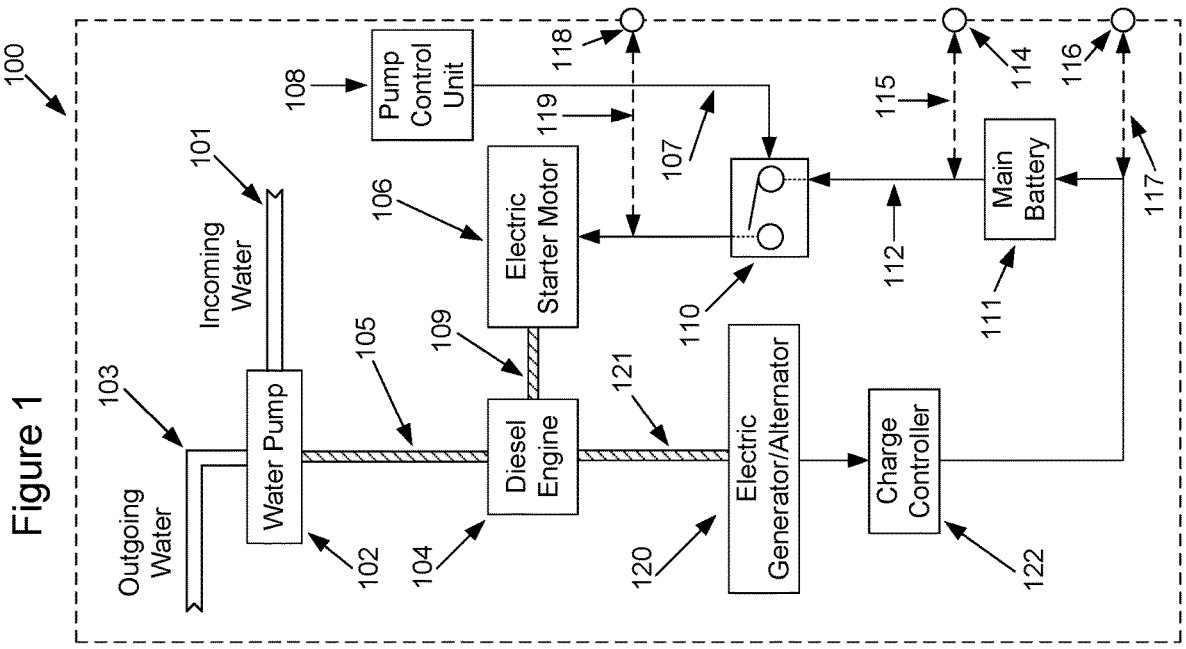
FIG. 1 is mechanical layout of a water pumping system to which the reserve power supply system of present invention can be attached.

FIG. 1 is block diagram which illustrates one embodiment of water pumping system 100 as known in the art to which the reserve power system of the present invention may be attached. The pumping system shown in FIG. 1 is by way of example only and the present invention is not limited thereto. Such a system was chosen to illustrate use of the invention because water pumping systems are often remotely located. The present invention may be used with other systems and machinery as well.

Water pumping system 100 includes a Water Inlet 101 which allows water to enter Water Pump 102 and outgoing Water Outlet 103 which allows water from Pump 3 to be sent to its point of use.

Water Pump 102 is driven by Diesel Engine 104 via Drive Shaft 105 as is known in the art.

As is the case with the typical diesel engine, Diesel Engine 104 is started by Electric Starter Motor 106 in response to Starter Motor Control Signal 107 from Pump Control Unit 108.

Starter Relay 110 is controlled by Starter Motor Control Signal 107 and connects Main Battery 111 to Starter Motor 106 in order to start Diesel Engine 104 when Water Pump 102 is required to operate.

In conventional remotely located machinery, such as the Water Pumping System 100 illustrated in FIG. 1, Main Battery 111 is connected directly to Relay 110 as indicated by line 112.

As is the case with most electrically operated machinery, there are a number of naturally occurring nodes that allow accessory electrical devices, such as the present invention to be attached thereto. Such nodes include node 114 as illustrated by dashed line 115, node 116 as illustrated by dashed line 117 and node 118 as illustrated by dashed line 119.

Nodes 114, 116 and 118, as well as additional nodes, may also be exposed to accessory devices thought engine control units as is known in the art.

Diesel Engine 104 also drives Electric Generator/Alternator 120 via Drive Shaft 121. Generator/Alternator 120 is used to charge Main Battery 111 through Charge Controller 122. The charge current from Charger Control 122 may also be made available node 116.

Figure 2:
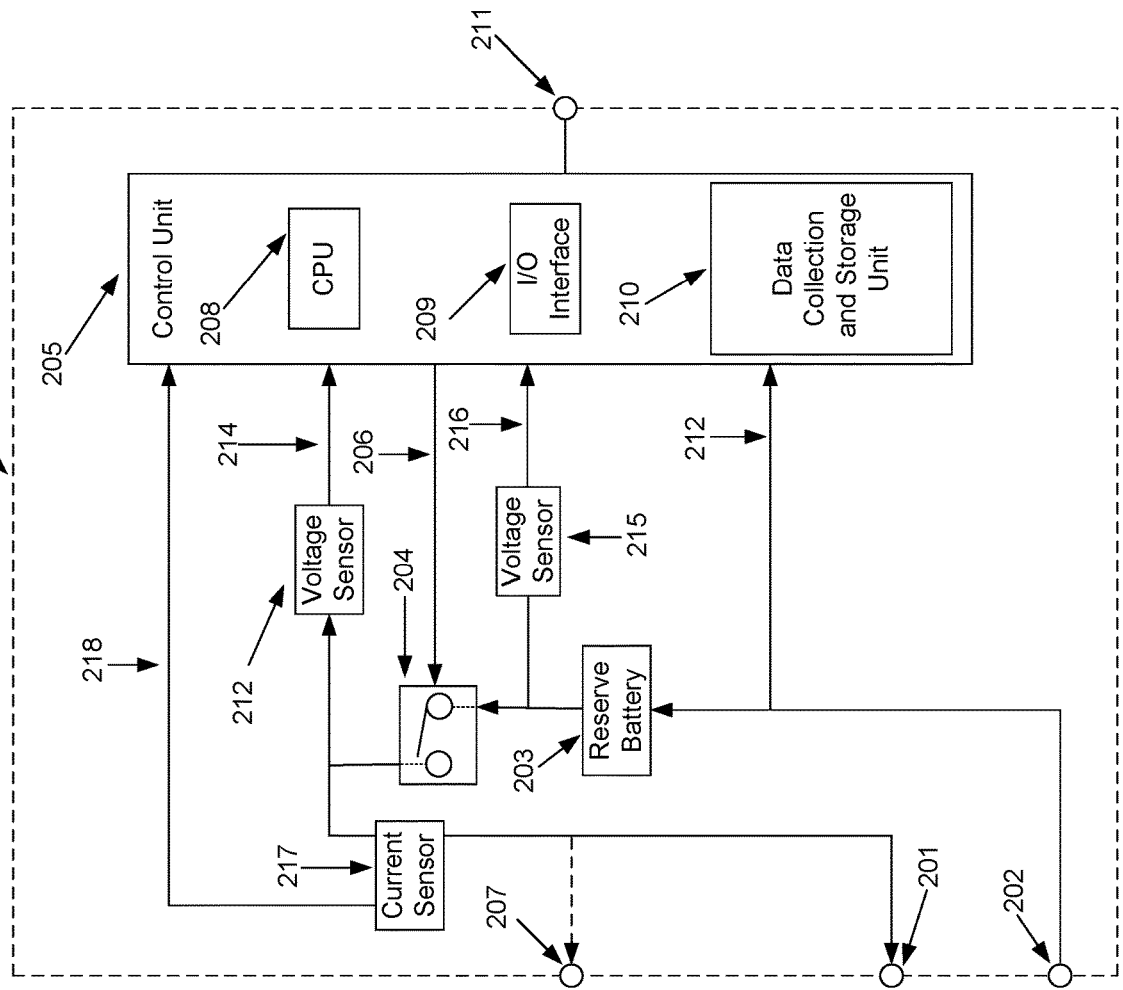
FIG. 2 is a block diagram of one embodiment of a reserve power supply system in accordance with the present invention.

FIG. 2 illustrates a reserve power supply system 200 in accordance with one embodiment of the present invention. System 200 can be coupled to, for example, Water Pump System 100 shown in FIG. 100, via nodes 201 and 202 to corresponding nodes 114 and 116 of the pump system.

As shown in FIG. 2, the reserve power supply system 200 includes Reserve Battery 203 which is coupled to Node 201 through Relay 204. Relay 204 is controlled by Control Unit 205 via Relay Control Signal 206. Thus, when Relay 204 is activated by Relay Control Signal 206, Reserve Battery 203 is placed in electrical parallel with Main Battery 111 shown in FIG. 1 via Nodes 114 and 201.

In an alternative embodiment, Reserve Battery 203 may be coupled directly to Electric Starter Motor 106 via Nodes 118 and 207 when desirable. For example, should Main Battery 111 developing an internal short circuit, coupling Reserve Battery 203 directly to Starter Motor 106 may be more desirable than placing Reserve Battery 203 in parallel with Main Battery 111.

Control Unit 205 includes a Central Processing Unit (CPU) 208, I/O Interface 209 and Data Collection and Storage Unit 210.

Control Unit 205 is coupled to communications node 211 which allows Control Unit 215 to communicate to remote facilities.

Voltage Sensor 212 measures the voltage drop across Main Battery 111 and provides Main Battery Voltage Signal 214 to Control Unit 205. Voltage Sensor 215 measures the voltage drop across Reserve Battery 203 and provides Reserve Battery Voltage Signal 216 to Control Unit 205.

As further shown in FIG. 2, Nodes 116 and 202 allow current from Charge Controller 122. Alternatively, Reserve Battery 203 may be coupled in parallel with Main Battery 111 for an extended period of time in order for Reserve Battery 203 to be charged indirectly.

Figure 3:
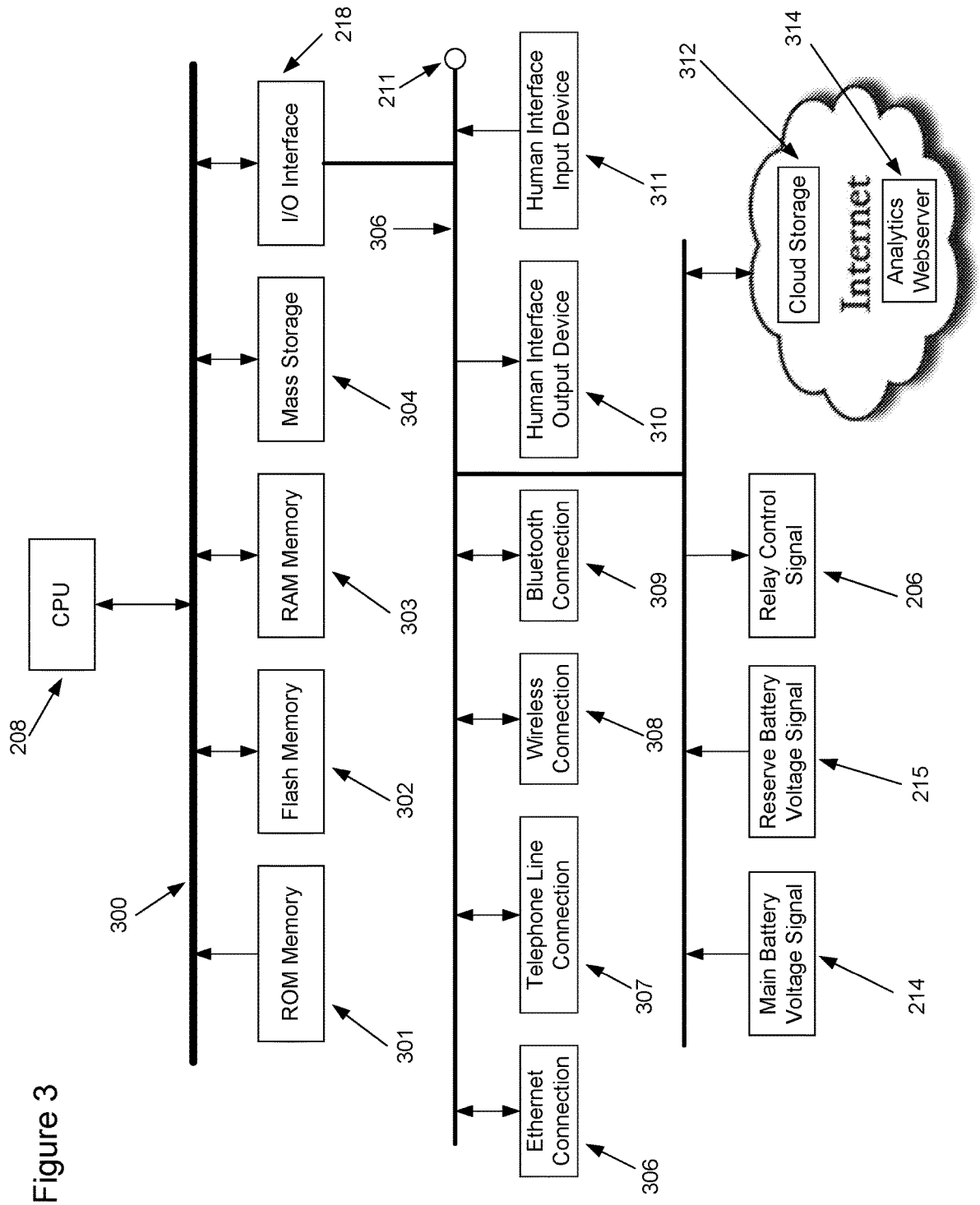
FIG. 3 is a block diagram of the control unit illustrated in FIG. 2.
Figure 4:
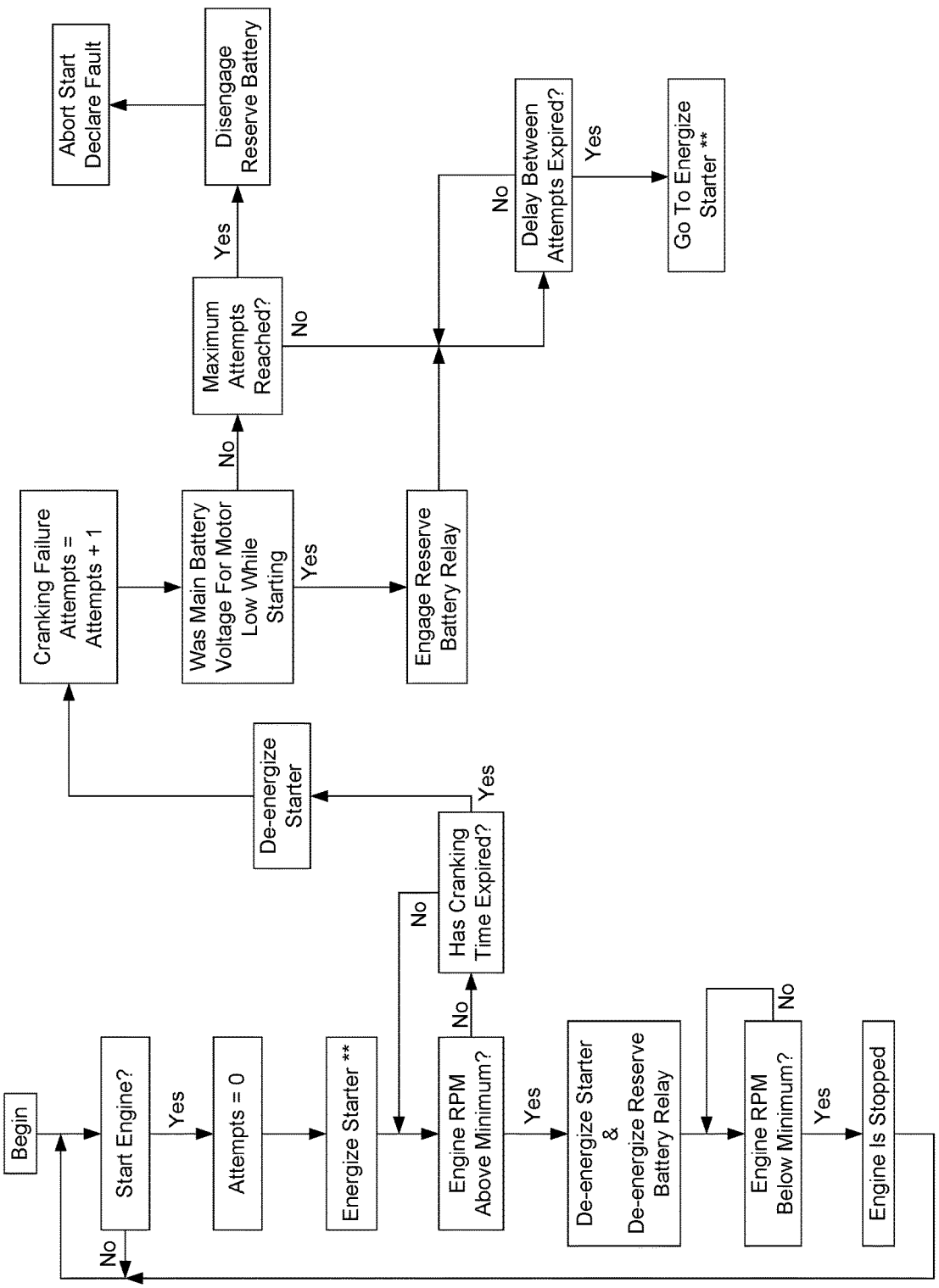
FIG. 4 is a flow chart illustrating the operational flow of the reserve power supply system shown in FIGS. 2 and 3.

FIG. 3 is a more detailed block diagram of Control Unit 205, including some of its interstitial elements.

As illustrated in FIG. 3, Control Unit 205 includes aforementioned CPU 208 which is used to execute computer software instructions as is known in the art. CPU 208 is coupled, via buss 300, to ROM Memory 301, Flash Memory 302, RAM Memory 303, Mass Storage 304 and aforementioned I/O Interface 2209 as also shown in FIG. 2.

ROM Memory 301 and Flash Memory 302 may be used to store computer software instructions for execution by CPU 217. RAM memory 303 may also be used for storing computer software instructions, and especially for storing information that is only needed for a short period of time. Mass Storage 304 is used for longer and larger data storage needs as required by aforementioned Data Collection and Storage Unit 210 as shown in FIG. 2.

The underlying firmware or software which CPU 208 executes may be updated from time to time in order to correct programming errors or the add additional features to the system. Such upgrades can be accomplished locally at the physical location of Control Unit 205 via Human Interface Output Device 310 and Human Interface Input Device 311, or remotely via communication connections 306-309 shown in FIG. 3

Data Collection and Storage Unit 210 provides a data logging function of the operation of the system which can be store in Ram memory 303 as well as Mass Storage 304 for later retrieval over an external data communication port as discussed below.

The logging data may also be stored in a remote database, such as Cloud Storage 312 on the Internet. The logging data may also be analyzed and modeled with analytic software such as might be resident on a Webserver 314 also on the Internet. Such Analysis and modeling can be used to gain insight regarding the state and operating condition of the machinery, such as Water Pump System 100 illustrated in FIG. 1, to which the reserve power system of the invention is connected.

CPU 208 is also coupled to a number of peripheral interface devices via I/O Interface 210 and its own buss 306.

Ethernet Connection 306, Telephone Line Connection 307, Wireless Connection and Bluetooth Connection 309 allow Control Unit 205 (FIG. 2) to communicate with remotely located devices and systems, for example the Internet and Data Store 312 and Analytics Webserver 314.

Bluetooth 309 enables Control Unit 205 to connect to and communicate with Bluetooth devices such as a smartphone. An app running on a smartphone may be used to received and display all or a predetermined subset of the logging data from Data Collection and Storage Unit 210. The app may also perform certain control functions, such as commanding main battery Relay 110 and reserve battery Relay 204 to switch from Main Battery 111 and Reserve Battery 203 to be coupled to Electric Starter Motor 106 in different ways for different purposes. Other control functions are possible as well.

A smart phone may also be used to connect to Analytics Webserver 314 for the same purpose.

Human Interface Output Device 310 and Human Interface Input Device 311 allow a human to communicate with Control Unit 216 directly. Thus, the Output Device 310 may include a visual display, status and warning lights and alarms. Input Device 311 may include settable switches, push buttons and a keyboard. Input Device 311 may also include a pointing device for use with a visual display for making on-screen selections and/or a rotary linear selection device for making user selections. Other the input devices may be used as well.

Control Unit 205 determines that Main Battery 111 does not have a sufficient charge to operate Electric Starter Motor 106 when Main Battery Signal 214 from Voltage Sensor 212 falls below a predetermine level. When that condition occurs, Control Unit 205 generates Relay Control Signal 206 which causes Relay 204 (FIG. 2) to be placed in parallel with Main Battery 111. As mentioned above, other switching arrangements of Relay 110 and 204 may be accomplished as well.

As further shown in FIG. 2, Current Sensor 217 provides a Current Signal 218 to Control Unit 205.

The software and firmware resident in ROM 301, Flash Memory and/or Ram Memory 303 may also include maintenance and diagnostic functions. Sensor Signals 214, 216 and 218 can be analyzed by Control Unit 208 to gain insights such as less than expected current flow can indicate:
1. A problem with the starter motor;
2. Main Battery 111 is beginning to discharge more rapidly than expected;
3. Electric Generator/Alternator 120 or Charge Controller 122 not providing sufficient current to recharge Main Battery 111 and/or Reserve Battery 203; and
4. An open coil windings in the starter motor.

Greater than expected current flow can indicate:
1. That the starter motor is beginning to fail due to current leakage through its internal insulation;
2. Internal shorts developing within the starter motor coils; and
3. A mechanical binding somewhere in the starter motor power train causing the starter motor to work hard and draw more current.

As part of the date analytics referred to with respect to Analytics Webserver 314 in FIG. 3, current and voltage data can be logged and analyzed over time and used to predicted failure and provide maintenance alerts.

While the foregoing specification teaches the principles of the present invention, with examples provided for the purpose of illustration, it will be appreciated by one skilled in the art from reading this disclosure that various changes in form and detail can be made without departing from the true scope of the invention.

What is claimed is:

1. A reserve power supply system, said system comprising:
   a first battery;
   an electrical interface adapted for being coupled to a second battery;
   a control unit;
   a switch coupled to said first battery, to said electrical interface and to said control unit, said switch being controlled by said control unit;
   a voltage sensor coupled to said control unit and to said electrical interface, said voltage sensor being adapted for measuring the voltage across said second battery when said second battery is coupled to said electrical interface and providing a corresponding voltage sensor signal to said control unit, wherein when said voltage sensor signal is below a predetermined value, said control unit controls said switch to coupled said first battery to said electrical interface.

2. The reserve power supply system of claim 1, wherein said control unit includes a central processing unit (CPU).

3. The reserve power supply system of claim 2, wherein said control unit includes a communications interface that enabling said control unit to communicate with a remote device.

4. The reserve power supply system of claim 1, wherein said control unit includes at least one memory unit coupled to said CPU, wherein said memory unit is programmed with control software for execution by said CPU.

5. The reserve power system of claim 4, wherein said memory unit is adaptable for being reprogrammed with different said control software.

6. The reserve power supply system of claim 5, wherein said memory unit is adaptable for being reprogrammed with different said control software from said remote device.

7. The reserve power supply system of claim 1, wherein said control unit comprises:
- a central processing unit (CPU);
- a communications interface coupled to said CPU that enabling said control unit to communicate with a remote device;
- at least one memory unit coupled to said CPU, wherein said memory unit is programmed with control software for execution by said CPU, wherein said memory unit is adaptable for being reprogrammed with different said control software from said remote device.

8. The reserve power supply system of claim 1, wherein said switch is a mechanical relay.

9. The reserve power supply system of claim 1, wherein said switch is a semiconductor switch.

10. The reserve power supply system of claim 1, wherein said memory unit stores a digital replica of said voltage sensor signal over a predetermined period of time.

11. The reserve power supply system of claim 1, further comprising a current sensor coupled to said control unit and to said electrical interface, said current signal sensor being adapted for measuring the current delivered to said electrical interface by said first battery and providing a corresponding current sensor signal to said control unit.

12. The reserve power supply system of claim 11, wherein said memory unit stores a digital replica of said current sensor signal over a predetermined period of time.

13. The reserve power supply system of claim 10, further comprising a current sensor coupled to said control unit and to said electrical interface, said current signal sensor being adapted for measuring the current delivered to said electrical interface by said first battery and providing a corresponding current sensor signal to said control unit.

14. The reserve power supply system of claim 13, wherein said memory unit stores a digital replica of said current sensor signal over a predetermined period of time.

15. The reserve power supply system of claim 14, wherein said system comprises an analytics module for analyzing said digital replica of said voltage signal and said digital replica of said current signal.

16. The reserve power supply system of claim 15, wherein in response to said analysis said analytics module provides maintenance and diagnostics information related to the device to which said reserve power system is attached.

17. The reserve power supply system of claim 15, wherein said digital replica of said voltage sensor signal and said digital replica of said current sensor signal are communicated by said control unit to a remote location for storage and analysis.

18. The reserve power supply system of claim 17, wherein said remote location is on a computer network.

19. The reserve power supply system of claim 18, wherein said analysis is performed by a server on said computer network.

20. The reserve power supply system of claim 19, wherein said server is a secured server and said digital replica of said voltage sensor signal and said digital replica of said current sensor signal are communicated to said server over a secure communications channel.

* * * * *